United States Patent
Souma et al.

(10) Patent No.: US 10,253,913 B2
(45) Date of Patent: Apr. 9, 2019

(54) CURVED TUBE STRUCTURE AND DIE FOR FORMING CURVED TUBE

(71) Applicant: NIFCO INC., Yokosuka-shi, Kanagawa (JP)

(72) Inventors: Youhei Souma, Yokosuka (JP);
Hiroyuki Nakaya, Yokosuka (JP);
Yoshio Tomono, Yokosuka (JP);
Tadahiro Kitamura, Yokosuka (JP);
Yoshiyuki Goto, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 709 days.

(21) Appl. No.: 14/428,464

(22) PCT Filed: Sep. 13, 2013

(86) PCT No.: PCT/JP2013/074933
§ 371 (c)(1),
(2) Date: Mar. 16, 2015

(87) PCT Pub. No.: WO2014/046063
PCT Pub. Date: Mar. 27, 2014

(65) Prior Publication Data
US 2015/0226360 A1    Aug. 13, 2015

(30) Foreign Application Priority Data
Sep. 18, 2012 (JP) .................... 2012-204534

(51) Int. Cl.
*F16L 43/00* (2006.01)
*B29C 45/26* (2006.01)
(Continued)

(52) U.S. Cl.
CPC ........ *F16L 43/008* (2013.01); *B29C 45/2614* (2013.01); *B29C 45/4421* (2013.01);
(Continued)

(58) Field of Classification Search
CPC ......... F16L 43/00; F16L 43/008; F16L 41/03; F16L 41/023; F16L 41/021; F16L 9/006;
(Continued)

(56) References Cited

U.S. PATENT DOCUMENTS 4,440,712 A * 4/1984 Imgram ................ 138/DIG. 8X
6,390,142 B1 * 5/2002 Naito ............................ 138/177
(Continued)

FOREIGN PATENT DOCUMENTS

CN    1072627 A    6/1993
CN    2506597 Y    8/2002
(Continued)

OTHER PUBLICATIONS

Europe Patent Office, "Search Report for European Patent Application No. 13838262.7," dated Apr. 7, 2016.
(Continued)

*Primary Examiner* — Greg Binda
*Assistant Examiner* — Zachary T Dragicevich
(74) *Attorney, Agent, or Firm* — Manabu Kanesaka

(57) ABSTRACT

A curved tube structure, including: a tube main body including a bent portion at one portion in an axis line direction; and an enlarged cross-section portion formed along the axis line direction of the tube main body in an inner periphery inside a bending direction of the bent portion for enlarging a cross-section area of the tube main body.

11 Claims, 15 Drawing Sheets

(51) Int. Cl.
   *B29C 45/44*    (2006.01)
   *B29L 31/24*    (2006.01)
   *B29L 23/00*    (2006.01)
   *F16L 41/02*    (2006.01)
   *F16L 41/03*    (2006.01)

(52) U.S. Cl.
   CPC ..... *B29L 2023/004* (2013.01); *B29L 2031/24* (2013.01); *F16L 41/021* (2013.01); *F16L 41/023* (2013.01); *F16L 41/03* (2013.01)

(58) Field of Classification Search
   CPC ............ B29C 45/4221; B29C 45/2614; B29L 2031/24; B29L 2023/004
   USPC .......................... 285/179; 138/177, DIG. 8
   See application file for complete search history.

(56) References Cited

U.S. PATENT DOCUMENTS

| | | | |
|---|---|---|---|
| 6,422,608 B1 | 7/2002 | Lee et al. | |
| 7,810,524 B2 * | 10/2010 | Sakazaki | 138/177 X |
| 8,235,074 B2 * | 8/2012 | Sakita | 138/177 X |
| 2002/0114908 A1 | 8/2002 | Evans et al. | |

FOREIGN PATENT DOCUMENTS

| | | | |
|---|---|---|---|
| EP | 1243841 A1 | 9/2002 | |
| GB | 886331 A | 1/1962 | |
| JP | S51-047952 A | 4/1976 | |
| JP | S53-127559 A | 11/1978 | |
| JP | S57-065812 U | 4/1982 | |
| JP | H04-362394 A | 12/1992 | |
| JP | 2002-525525 A | 8/2002 | |
| JP | 2003-254490 A | 9/2003 | |
| JP | 2005-214251 A | 8/2005 | |
| JP | 3893581 B2 | 3/2007 | |
| JP | 2009-184203 A | 8/2009 | |
| JP | 5228127 B1 * | 7/2013 | ............... E03B 7/12 |

OTHER PUBLICATIONS

PCT/ISA/210, "International Search Report for PCT/JP2013/074933," dated Nov. 26, 2013.

China Patent Office, "Office Action for Chinese Patent Application No. 201610901646.6," dated Feb. 24, 2018.

* cited by examiner

CURVED TUBE STRUCTURE AND DIE FOR FORMING CURVED TUBE

RELATED APPLICATIONS

The present application is National Phase of International Application No. PCT/JP2013/074933 filed Sep. 13, 2013, and claims priority from Japanese Application No. 2012-204534, filed Sep. 18, 2012, the disclosure of which is hereby incorporated by reference herein in its entirety.

FIELD OF TECHNOLOGY

The present invention relates to a curved tube structure and a die for forming a curved tube applied to a bending portion of a piping forming a flow path for a fluid.

BACKGROUND ART

Conventionally, as for a curved tube applied to the bending portion of the piping forming the flow path for a fluid, for example, there are Patent Documents 1 and 2. In the Patent Document 1, a water-supply-pipe-insertion stopper protrusion inside an inner peripheral face of a bent portion is improved in an R shape so as to have a structure with little pressure loss (head loss). Also, in the Patent Document 2, when a main core of an inner die is pulled out to move, a swing member retracts and swings to an inward retraction position from a formation position by an undercut portion, and the swing member retracts and slides to the inward retraction position from the formation position by the undercut portion. Then, the swing member retracts and swings, and a sliding member retracts and slides, so that the main core can be pulled out of the curved tube.

PRIOR ART DOCUMENT

Patent Document

Patent Document 1: Japanese Patent Application Publication No. 2010-64472
Patent Document 2: Japanese Patent Application Publication No. 2009-285905

SUMMARY OF THE INVENTION

Problems to be Solved by the Invention

The present invention provides a curved tube structure and a die for forming a curved tube, which can be applied to a curved tube having a small diameter and reduce a pressure loss of a fluid.

Means for Solving the Problems

A first aspect of the present invention provides a curved tube structure including a tube main body including a bent portion at one portion in an axis line direction; and an enlarged cross-section portion formed along the axis line direction of the tube main body in an inner periphery inside a bending direction of the bent portion for enlarging a cross-section area of the tube main body.

In the aforementioned aspect, there is formed the enlarged cross-section portion for enlarging the cross-section area of the tube main body along the axis line direction of the tube main body in the inner periphery inside the bending direction of the bent portion of the tube main body. Consequently, when a fluid passes through the inside of the bent portion of the tube main body, a pressure loss of the fluid can be reduced by the enlarged cross-section portion. Also, the enlarged cross-section portion is formed along the axis line direction of the tube main body in the inner periphery inside the bending direction of the bent portion, so that a structure of a die becomes simplified so as to be applied to a curved tube having a small diameter as well.

As for a second aspect of the present invention, in the first aspect of the present invention, the enlarged cross-section portion may be a concave portion whose shape viewed from the axis line direction forms an arc wherein both side wall portions and a bottom face protrude to an outer peripheral side of the tube main body.

In the aforementioned aspect, the shape of the enlarged cross-section portion viewed from the axis line direction has the concave portion forming the arc wherein both side wall portions and the bottom face protrude to the outer peripheral side of the tube main body. Consequently, a flow-path cross-section area of the bent portion can enlarge. As a result, the pressure loss of the fluid can be reduced.

As for a third aspect of the present invention, in the second aspect of the present invention, both side wall portions and the bottom face may be smoothly connected to form the arc.

In the aforementioned aspect, both side wall portions and the bottom face are smoothly connected to form the arc. Consequently, the structure of the die becomes simplified.

As for a fourth aspect of the present invention, in the second aspect of the present invention, borders between both side wall portions and the bottom face may be bent to form the arc.

In the aforementioned aspect, the borders between both side wall portions and the bottom face are bent to form the arc. Consequently, the flow-path cross-section area of the bent portion can enlarge. As a result, the pressure loss of the fluid can be reduced.

As for a fifth aspect of the present invention, in the first aspect of the present invention, in the enlarged cross-section portion, the shape viewed from the axis line direction may have the concave portion forming the arc wherein both side wall portions have straight lines and the bottom face protrudes to the outer peripheral side of the tube main body.

In the aforementioned aspect, the shape of the enlarged cross-section portion viewed from the axis line direction has the concave portion forming the arc wherein both side wall portions have the straight lines and the bottom face protrudes to the outer peripheral side of the tube main body. Consequently, the flow-path cross-section area of the bent portion can enlarge. As a result, the pressure loss of the fluid can be reduced.

As for a sixth aspect of the present invention, in the first aspect of the present invention, in the enlarged cross-section portion, the shape viewed from the axis line direction may form the concave portion wherein both side wall portions and the bottom face have straight lines.

In the aforementioned aspect, the shape of the enlarged cross-section portion viewed from the axis line direction forms the concave portion wherein both side wall portions and the bottom face have the straight lines. Consequently, the structure of the die becomes simplified.

As for a seventh aspect of the present invention, in any one of the first to sixth aspects of the present invention, the bottom face of the concave portion may form a curved face protruding to the axis line side when the concave portion is viewed from a side orthogonal in the axis line direction.

In the aforementioned aspect, the bottom face of the concave portion forms the curved face protruding to the axis line side when the concave portion is viewed from the side orthogonal in the axis line direction. Consequently, a flow path becomes smooth, and the pressure loss of the fluid can be reduced.

As for an eighth aspect of the present invention, in any one of the first to sixth aspects of the present invention, the bottom face of the concave portion may form an inclined face when the concave portion is viewed from the side orthogonal in the axis line direction.

In the aforementioned aspect, the bottom face of the concave portion forms the inclined face when the concave portion is viewed from the side orthogonal in the axis line direction, so that the structure of the die can be simplified.

A ninth aspect of the present invention provides a die for forming a curved tube comprising an inner die formed along the axis line direction in the inner periphery inside the bending direction of the bent portion provided at one portion in the axis line direction, and forming an inner peripheral face of the tube main body including the enlarged cross-section portion for enlarging the cross-section area; and an outer die forming an outer peripheral face of the tube main body. The inner die includes a pair of main cores separating to be pulled out and approaching to move in the axis line direction of the tube main body so as to be mutually separable and incorporable in the axis line direction; and a sub core inserted into a groove portion formed along the axis line direction at least at one of the pair of main cores, where at least one of the pair of main cores can relatively move between a formation position and a retraction position along the groove portion, and at least one of the pair of main cores moves to a direction of the retraction position, so that a tip portion having a shape engaging with the inner periphery inside the bending direction of the bent portion swings to the formation position of at least one of the pair of main cores.

In the aforementioned aspect, the tube main body including the enlarged cross-section portion formed along the axis line direction in the inner periphery inside the bending direction of the bent portion for enlarging the cross-section area of the tube main body is formed by the outer die and the inner die, and then, the outer die is removed, and the inner die and the tube main body are separated. At that time, the pair of main cores which the inner die includes is separated, and respectively moves in a retraction-positional direction. Also, the main core moves along the groove portion from the formation position in the retraction-positional direction along the axis line direction relative to the sub core inserted into the groove portion formed along the axis line direction at least at one of the pair of main cores. Accompanied by a movement of the main core, the tip portion of the sub core having the shape engaging with the inner periphery inside the bending direction of the bent portion swings to the formation position of the main core where the main core has moved to provide an empty space. Consequently, the inner die can be effortlessly pulled out of the tube main body. Also, the inner die has a structure of inserting the sub core into the enlarged cross-section portion formed along the axis line direction in the inner periphery inside the bending direction of the bent portion. Consequently, the structure of the inner die becomes simplified. As a result, the inner die can be applied to the curved tube having the small diameter as well. Also, in the molded tube main body, the enlarged cross-section portion formed along the axis line direction in the inner periphery inside the bending direction of the bent portion can reduce the pressure loss of the fluid.

Effect of the Invention

The first aspect of the present invention has the aforementioned structure so as to be applied to the curved tube having the small diameter and reduce the pressure loss of the fluid.

The second aspect of the present invention has the aforementioned structure so as to reduce the pressure loss of the fluid.

The third aspect of the present invention has the aforementioned structure so as to simplify the structure of the die.

The fourth aspect of the present invention has the aforementioned structure so as to reduce the pressure loss of the fluid.

The fifth aspect of the present invention has the aforementioned structure so as to reduce the pressure loss of the fluid.

The sixth aspect of the present invention has the aforementioned structure so as to simplify the structure of the die.

The seventh aspect of the present invention has the aforementioned structure so as to reduce the pressure loss of the fluid.

The eighth aspect of the present invention has the aforementioned structure so as to simplify the structure of the die.

The die for forming a curved tube of the present invention according to claim 9 has the aforementioned structure so as to be applied to the curved tube having the small diameter and reduce the pressure loss of the fluid.

BEST MODES OF CARRYING OUT THE INVENTION

Figure 1:
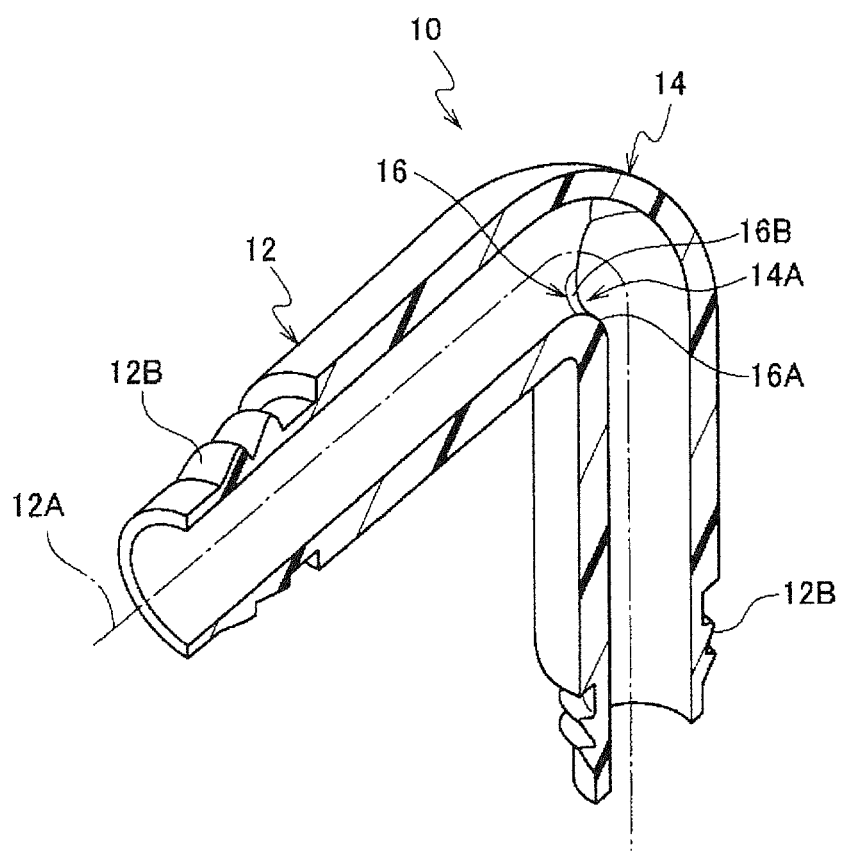
FIG. 1 is a perspective view wherein one portion showing a curved tube structure is shown as a cross section viewed from a side orthogonal in an axis line direction according to the first embodiment of the present invention.

Next, the first embodiment of a curved tube structure and a die for forming a curved tube of the present invention will be explained according to FIG. 1 to FIG. 8.

Incidentally, in the drawings, the same symbols are assigned to members (components) having the same or corresponding functions, and their explanations are appropriately omitted.

(Curved Tube Structure)

Figure 2:
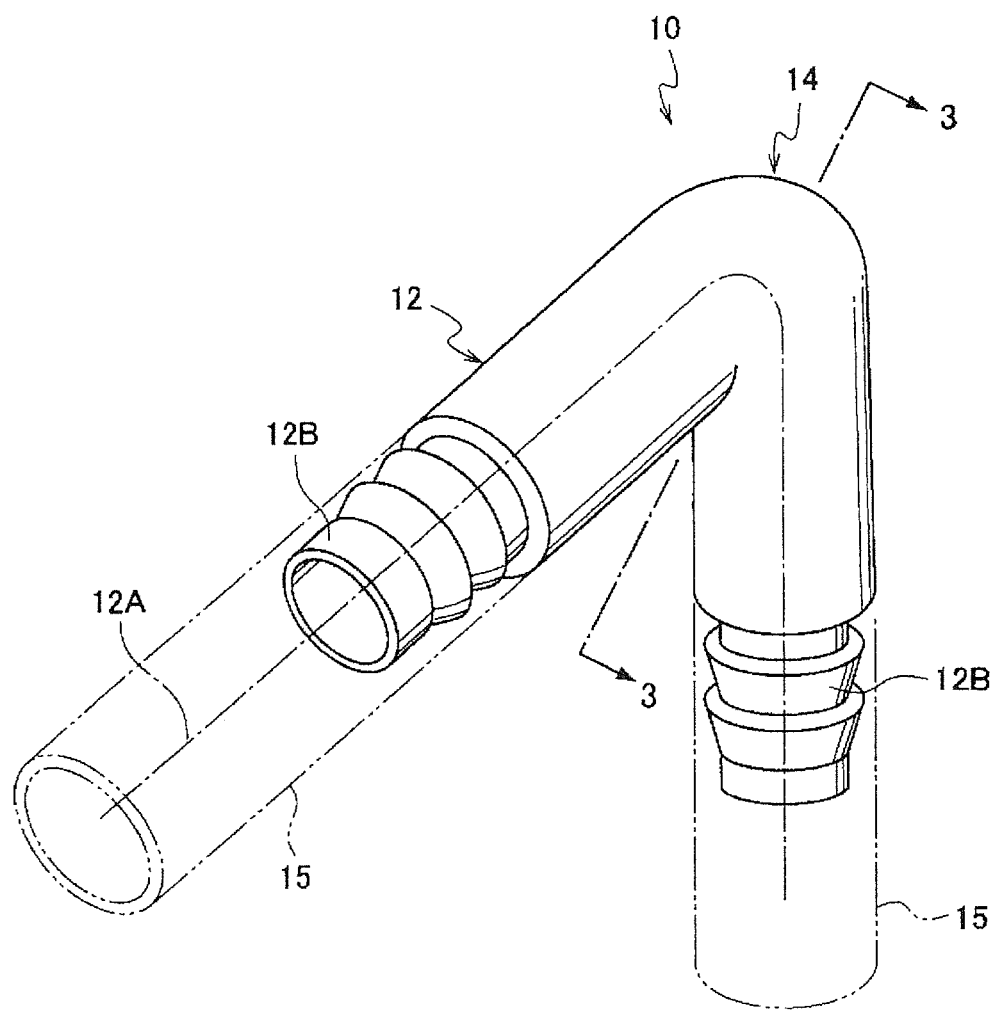
FIG. 2 is a perspective view showing the curved tube structure according to the first embodiment of the present invention.

As shown in FIG. 2, in a tube main body 12 of a curved tube 10 of the present embodiment, a flow path having a cross-sectional circular shape follows an axis line 12A, and the tube main body 12 includes a bent portion 14 bent approximately at a right angle at one portion in a direction along the axis line 12A. Also, both end portions 12B of the tube main body 12 are open, and as one example, a hose 15 is connected to both end portions 12B, respectively.

As shown in FIG. 1, in an inner periphery 14A inside a bending direction of the bent portion 14, there is formed a concave portion 16 as an enlarged cross-section portion along the direction of the axis line 12A, and the concave portion 16 enlarges a cross-section area of the bent portion 14. Therefore, when a fluid (an arrow W in FIG. 1) such as a liquid and the like passes through the inside of the bent portion 14, the concave portion 16 can reduce a pressure loss of the fluid.

Figure 3:
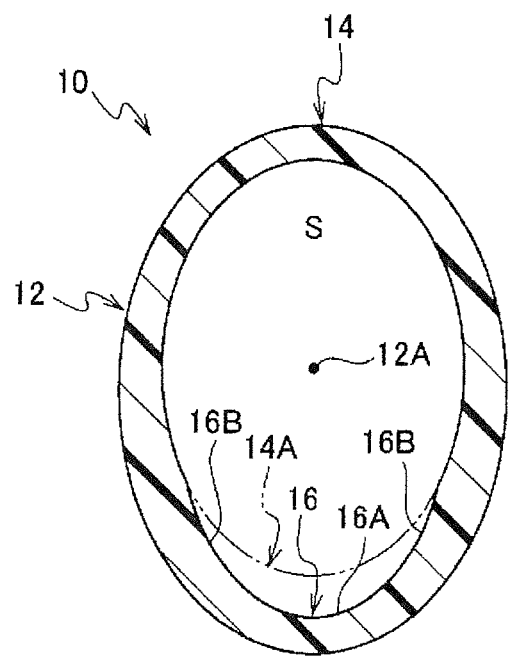
FIG. 3 is an enlarged cross-sectional view taken along a cross-sectional line 3-3 in FIG. 2.
Figure 23:
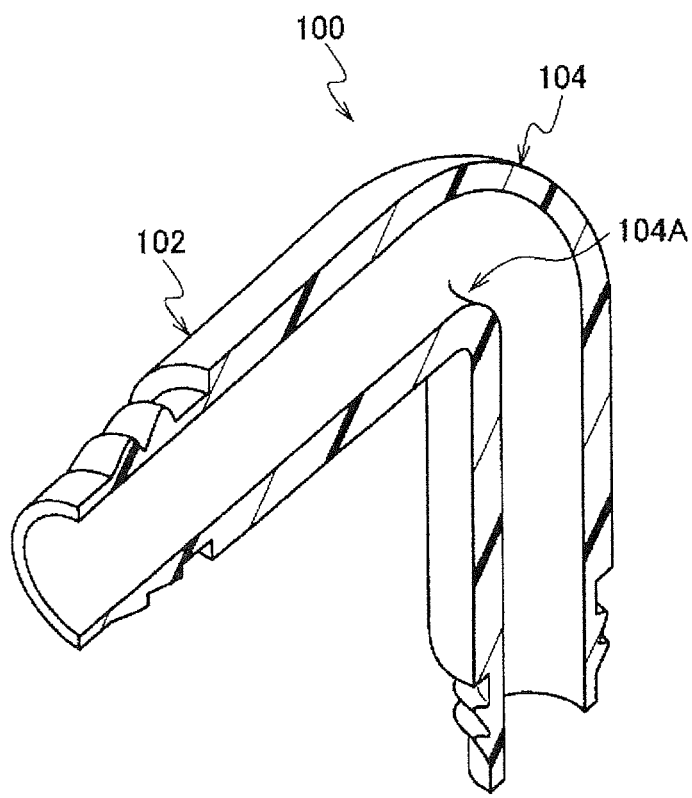
FIG. 23 is a perspective view corresponding to FIG. 1 showing the curved tube structure according to a conventional example.
Figure 24:
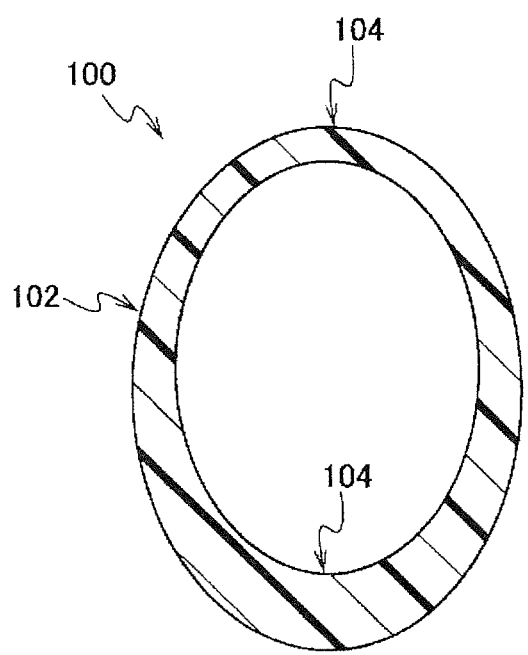
FIG. 24 is a cross-sectional view corresponding to FIG. 3 showing the curved tube structure according to the conventional example.

As shown in FIG. 3, the concave portion 16 is formed in the inner periphery 14A inside the bending direction of the bent portion 14 shown by a two-dot chain line. Also, in the concave portion 16, a shape viewed from an axis line 12A direction (a shape viewed from the direction along the axis line 12A) forms an arc wherein both side wall portions 16B and a bottom face 16A protrude to an outer peripheral side of the tube main body 12. Consequently, as a conventional example shown in FIG. 23 and FIG. 24, compared to a tube main body 102 wherein the enlarged cross-section portion is not formed in an inner periphery 104 inside a bending direction of a bent portion 104, in the tube main body 12 of the present embodiment, a flow-path cross-section area S of the bent portion 14 enlarges. Incidentally, in the present embodiment, both side wall portions 16B and the bottom face 16A are smoothly connected to form the arc.

Next, an operation of the present embodiment will be explained.

In the tube main body 12 of the present embodiment, when the fluid (the arrow W in FIG. 1) such as the liquid and the like passes through the inside of the bent portion 14, the concave portion 16 can reduce the pressure loss of the fluid. Also, the tube main body 12 has a structure of forming the concave portion 16 along the direction of the axis line 12A in the inner periphery 14A inside the bending direction of the bent portion 14, so that a structure of the die becomes simplified so as to be applied to a curved tube having a small diameter (for example, a curved tube having an inner diameter of 40 mm or less) as well.

Also, in the present embodiment, the shape of both side wall portions 16B and the bottom face 16A in the concave portion 16 viewed from the axis line 12A direction forms the arc protruding to the outer peripheral side of the tube main body 12, and both side wall portions 16B and the bottom face 16A are smoothly connected to form the arc. Consequently, the structure of the die can be simplified further.

(Die for Forming a Curved Tube)

Figure 6:
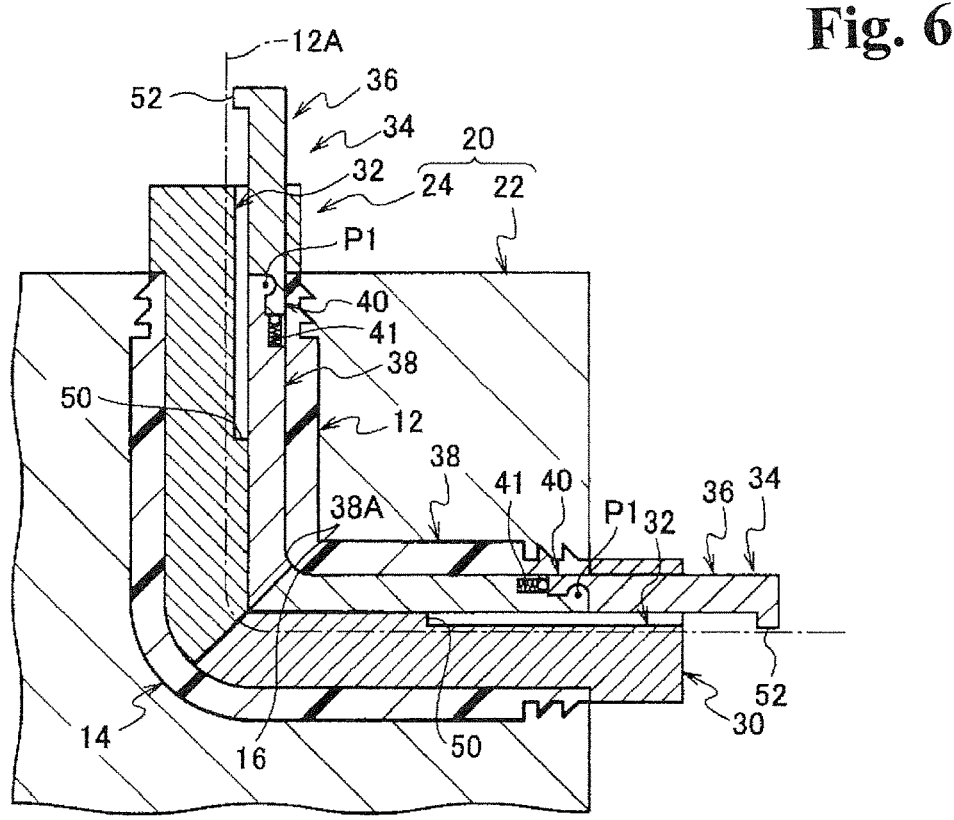
FIG. 6 is a cross-sectional view taken along the axis line direction of a curved tube and showing a formation position of the die for forming a curved tube according to the first embodiment of the present invention.

As shown in FIG. 6, a die 20 for forming a curved tube of the present embodiment comprises an outer die 22 and an inner die 24. The outer die 22 has a dual-partitioning split die structure, and forms an outer peripheral face of the tube main body 12 made of synthetic resin and molded by injection molding. On the other hand, the inner die 24 forms an inner peripheral face of the tube main body 12. The inner die 24 includes a pair of main cores 30 having the same shape; and hinge cores 34 (sub cores) as a pair of sub cores having the same shape. Each main core 30 and each hinge core 34 have a long shape along the direction of the axis line 12A of the tube main body 12. Also, each main core 30 and each hinge core 34 separate to be pulled out and approach to move in the direction of the axis line 12A of the tube main body 12 so as to be mutually separable and incorporable in the direction of the axis line 12A at a center portion in the direction of the axis line 12A in the bent portion 14.

Figure 4:
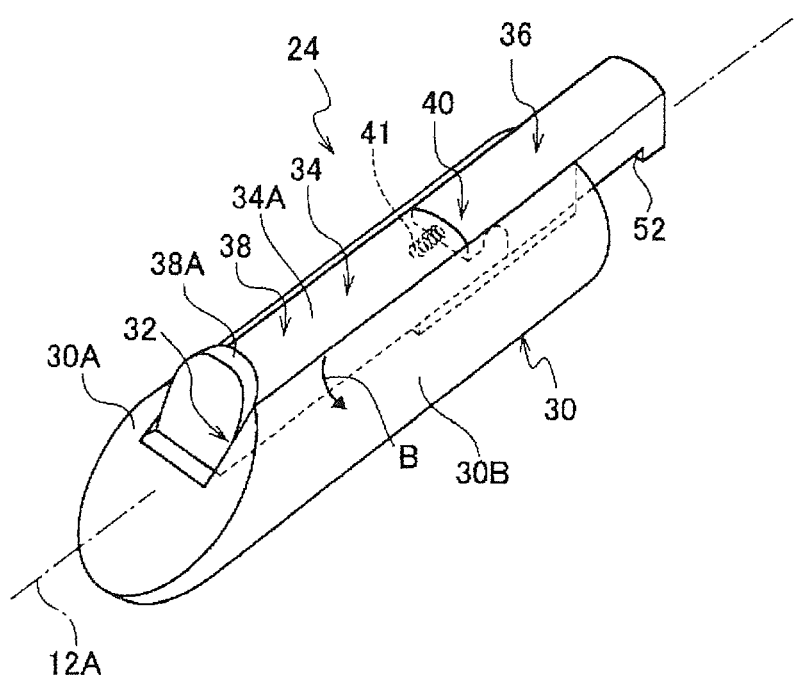
FIG. 4 is a perspective view showing an inner die of a die for forming a curved tube viewed from a tip side according to the first embodiment of the present invention.
Figure 5:
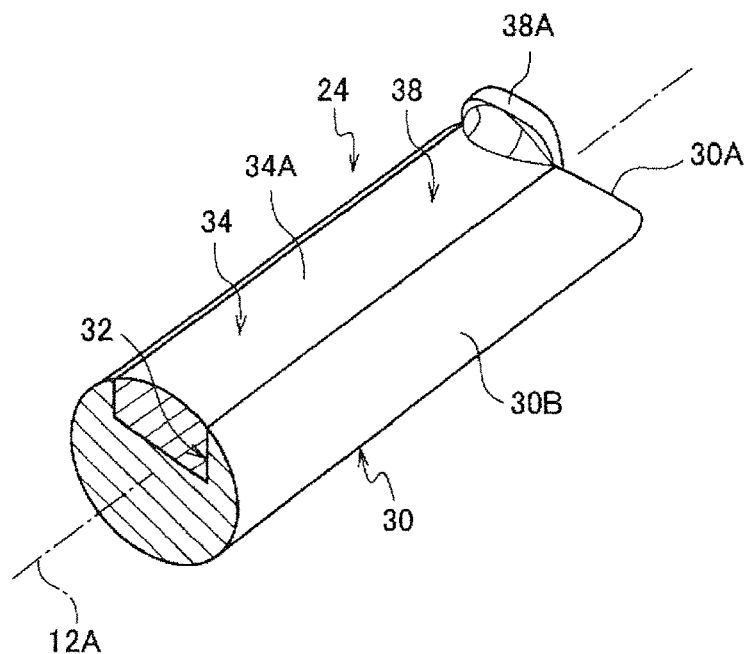
FIG. 5 is a perspective view showing one portion of the inner die of the die for forming a curved tube viewed from an opposite-tip side according to the first embodiment of the present invention.

As shown in FIG. 4 and FIG. 5, at a portion corresponding to the inner periphery 14A inside the bending direction of the bent portion 14 in each main core 30, there is formed a groove portion 32 along the direction of the axis line 12A of the tube main body 12. Consequently, a tip portion 30A of each main core 30 forms a shape which does not engage with an undercut portion of the inner periphery 14A (the concave portion 16) inside the bending direction of the bent portion 14 of the tube main body 12.

Each hinge core 34 is inserted into the groove portion 32 of each main core 30 relatively slidably along the direction of the axis line 12A of the tube main body 12 relative to the main core 30. Incidentally, the inner peripheral face of the tube main body 12 is formed by a curved molding face 30B of the main core 30 and a curved molding face 34A of the hinge core 34. Also, in each hinge core 34, a base portion 36 on one side in a longitudinal direction and a swing portion 38 on the other side in the longitudinal direction are connected by a hinge portion 40.

As shown in FIG. 6, in the hinge portion 40 of the hinge core 34, there are engaged a concave portion of the base portion 36 formed in a semicircular shape viewed from a side orthogonal in the direction of the axis line 12A; and a convex portion of the swing portion 38. Then, the swing portion 38 swings in a direction of approaching the axis line 12A (an arrow B direction in FIG. 4) and in a direction of separating from the axis line 12A (a direction opposite to an arrow B in FIG. 4) relative to the base portion 36 around an axis center P1 of the hinge portion 40. Also, the hinge portion 40 embeds a coil spring 41 as an urging device, and the swing portion 38 swings in the direction of approaching the axis line 12A (the arrow B direction in FIG. 4) relative to the base portion 36 by an urging force of the coil spring 41. Namely, the swing portion 38 is urged in the arrow B direction in FIG. 4 by the hinge portion 40, and is pressed against a bottom portion of the groove portion 32.

A tip 38A of the swing portion 38 of each hinge core 34 corresponds to the undercut portion of the concave portion 16 formed in the inner periphery 14A inside the bending direction of the bent portion 14 of the tube main body 12, and forms a curved shape engaging with the concave portion 16.

Namely, at a formation position shown in FIG. 6, in the swing portion 38 of the pair of hinge cores 34, the tip 38A is located at a position forming the concave portion 16 which is the inner periphery 14A inside the bending direction of the bent portion 14 of the tube main body 12. Also, the swing portion 38 of the pair of hinge cores 34 is housed in the groove portion 32 of each main core 30 which is located at the formation position.

Figure 7:
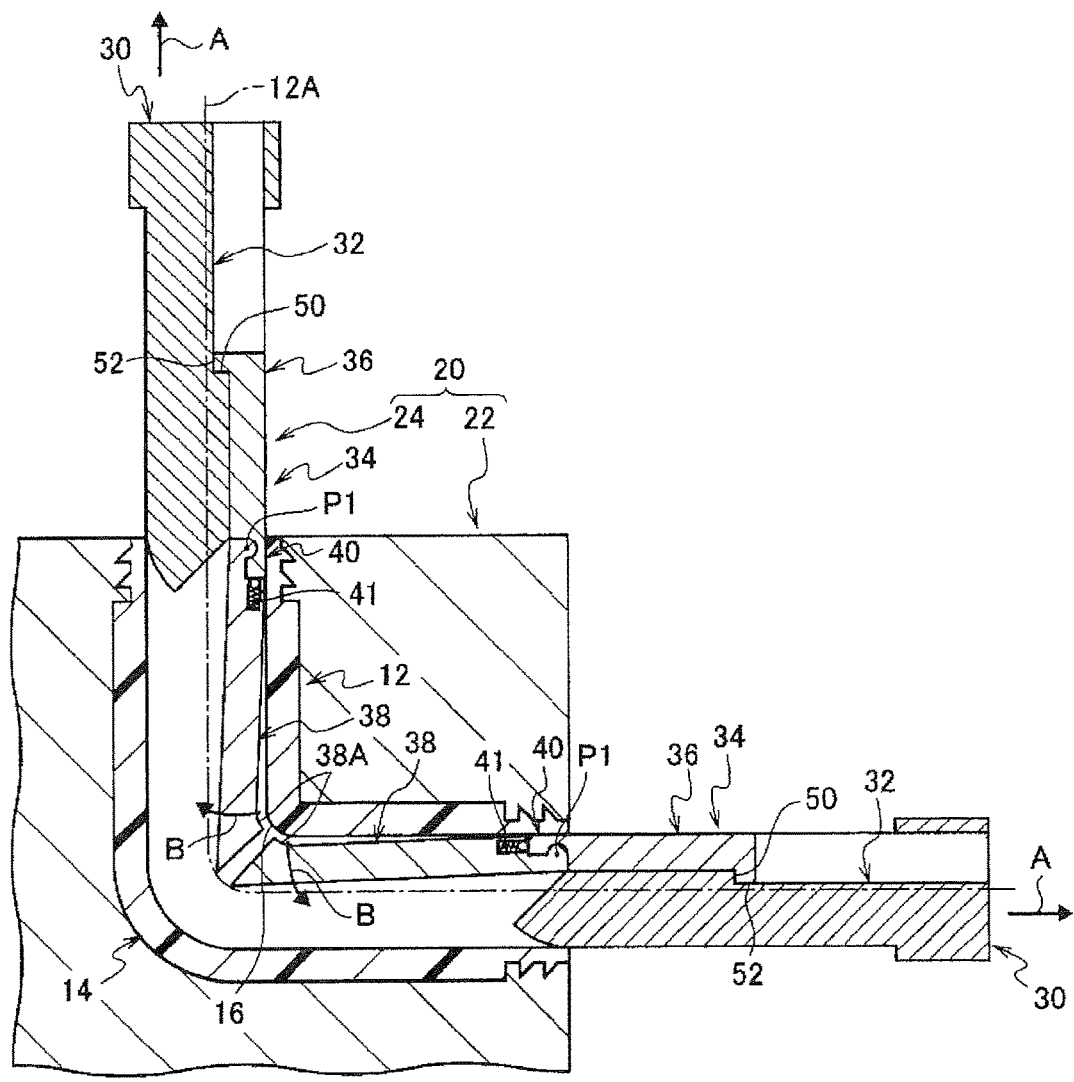
FIG. 7 is a cross-sectional view taken along the axis line direction of the curved tube showing a middle of a mold release of the die for forming a curved tube according to the first embodiment of the present invention.

As shown in FIG. 7, when the pair of main cores 30 is separated from each other and respectively moves in retraction-positional directions (arrow A directions in FIG. 7) from the formation position, the swing portions 38 of the respective hinge cores 34 swing in arrow B directions in FIG. 7 by the hinge portions 40. Namely, the swing portions 38 of the respective hinge cores 34 swing to the formation position (a swing position of the swing portion 38) of the main core 30 where the main core 30 has moved to provide an empty space as shown in FIG. 7 from the formation position shown in FIG. 6.

Figure 8:
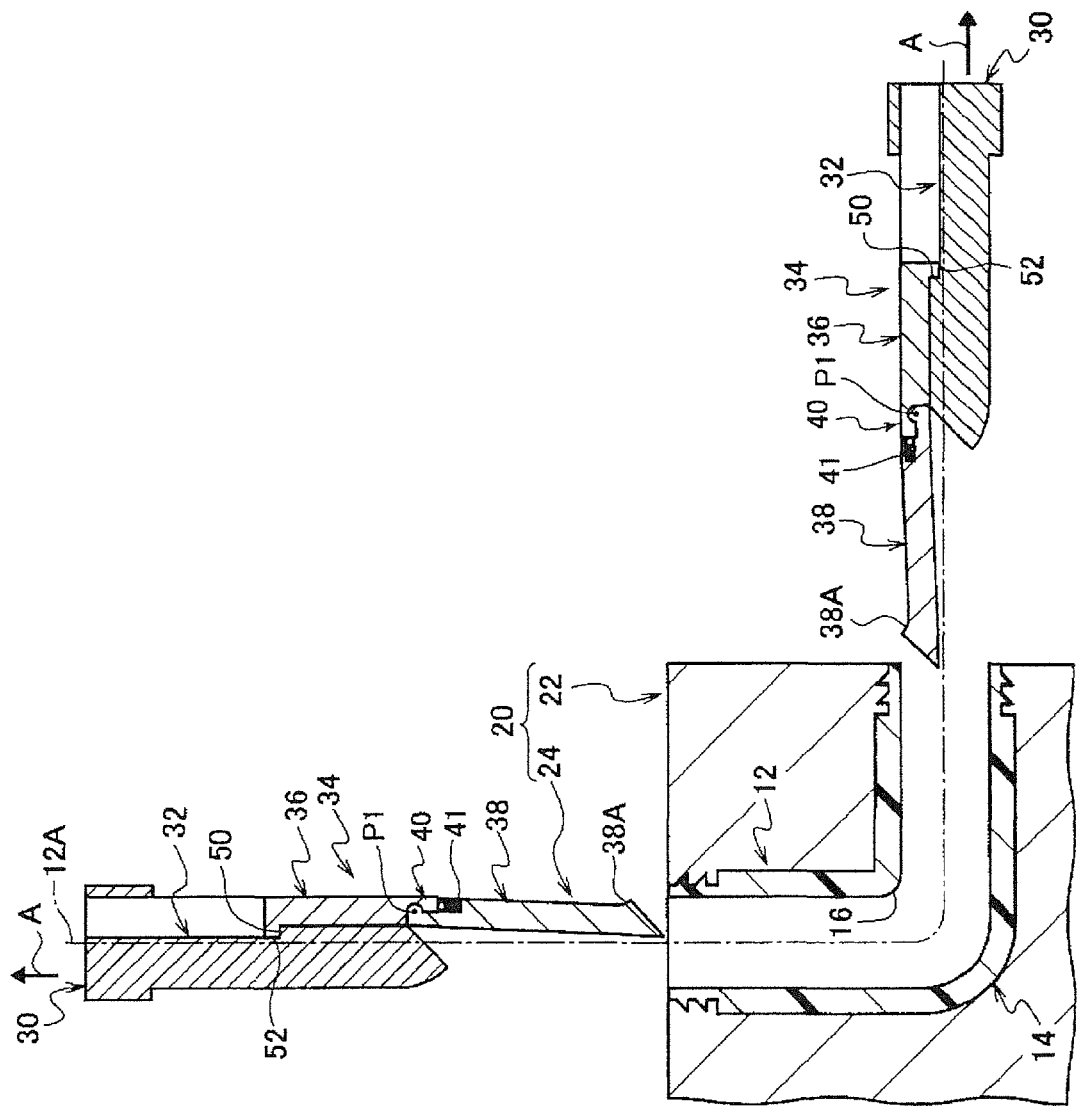
FIG. 8 is a cross-sectional view taken along the axis line direction of the curved tube and showing a middle of the mold release continuing from the die for forming a curved tube in FIG. 7 according to the first embodiment of the present invention.
Figure 9:
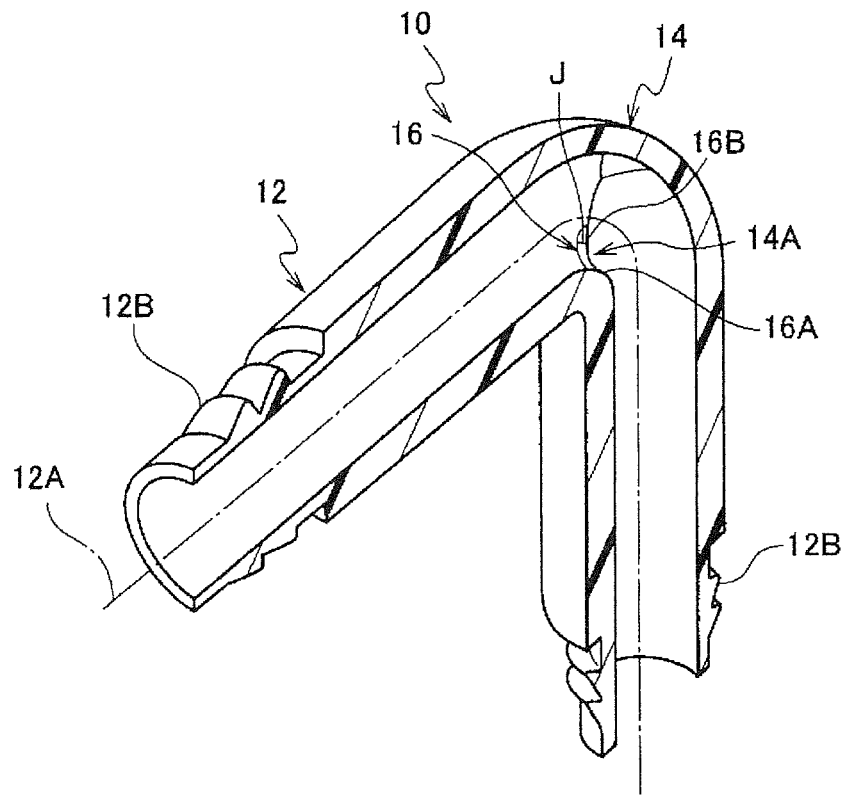
FIG. 9 is a perspective view corresponding to FIG. 1 showing the curved tube structure according to a second embodiment of the present invention.
Figure 10:
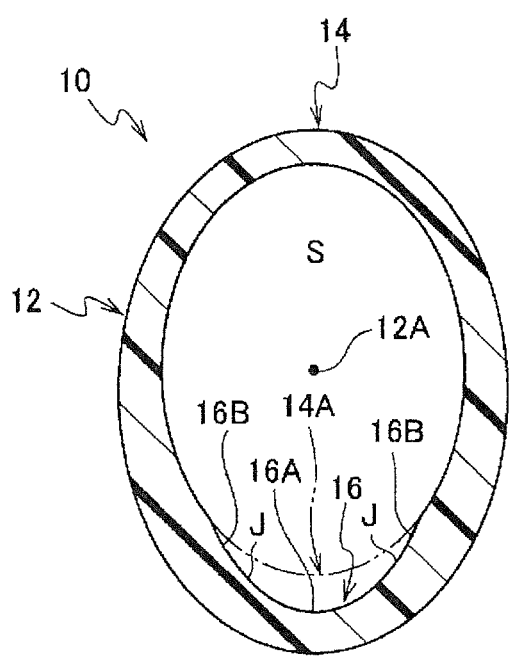
FIG. 10 is a cross-sectional view corresponding to FIG. 3 showing the curved tube structure according to the second embodiment of the present invention.
Figure 11:
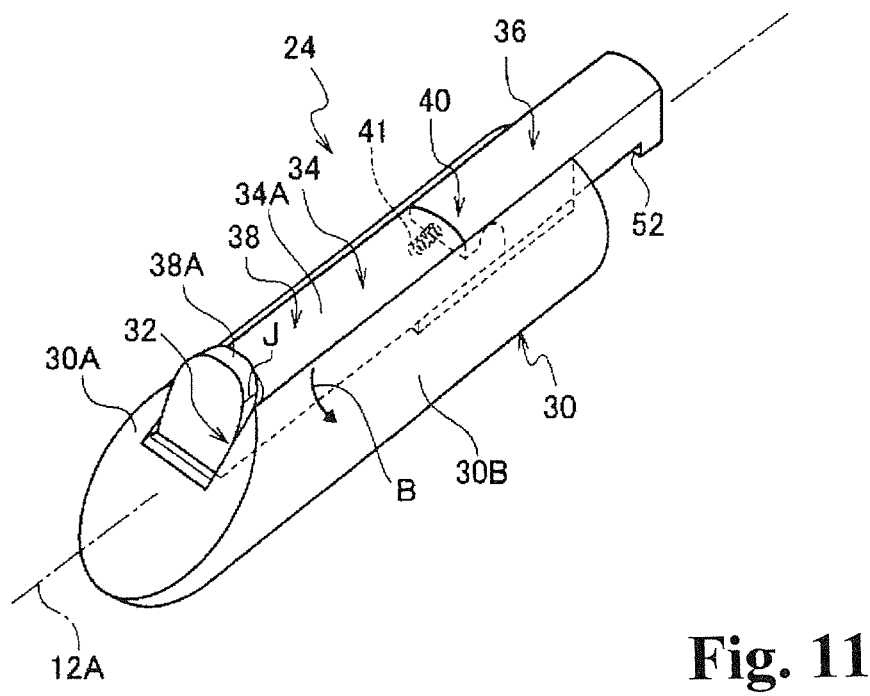
FIG. 11 is a perspective view showing the inner die of the die for forming a curved tube viewed from the tip side according to the second embodiment of the present invention.
Figure 12:
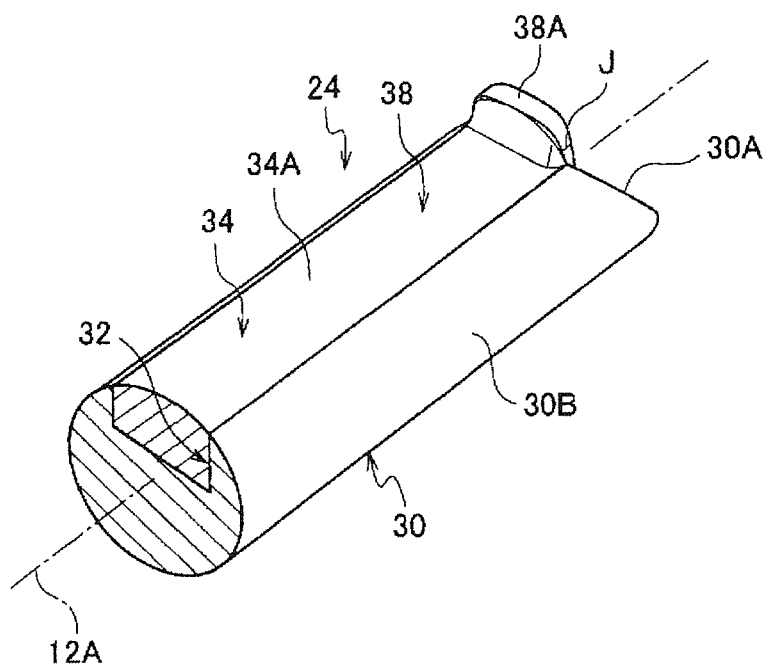
FIG. 12 is a perspective view showing one portion of the inner die of the die for forming a curved tube viewed from the opposite-tip side according to the second embodiment of the present invention.

As shown in FIG. 8, when the pair of main cores 30 moves in the retraction-positional directions (arrow A directions in FIG. 8) further, engagement portions 50 formed at tips of the groove portions 32 of the pair of main cores 30 engage with convex portions 52 formed in the base portions 36 of the respective hinge cores 34. Then, each hinge core 34 moves in the arrow A directions in FIG. 8 together with the pair of main cores 30, and the inner die 24 is separated from the tube main body 12.

Next, the operation of the present embodiment will be explained.

In a case wherein the tube main body 12 is formed by the die 20 for forming a curved tube of the present embodiment, first, a synthetic resin is injected into a space formed by the outer die 22 and the inner die 24 to form the tube main body 12 of the curved tube including the concave portion 16. After that, the outer die 22 is removed, and the inner die 24 and the tube main body 12 are separated.

At that time, the pair of main cores 30 is pulled out in pull-out directions (the arrow A directions in FIG. 7) along the axis line 12A relative to each hinge core 34 from the formation position shown in FIG. 6 along the groove portion 32 respectively to be separated from each other. Also, when the pair of main cores 30 is separated and respectively moves in the retraction-positional directions from the formation position, the swing portion 38 of each hinge core 34 swings to the formation position of each main core 30 where each main core 30 has moved to provide the empty space by the hinge portion 40. Consequently, the swing portion 38 of each hinge core 34 comes to the swing position shown in FIG. 7. Next, as shown in FIG. 8, when the pair of main cores 30 moves in the retraction-positional directions (the arrow A directions in FIG. 8) further, the engagement portion 50 formed at the tip of each groove portion 32 of the pair of main cores 30 engages with the convex portion 52 formed in the base portion 36 of each hinge core 34. Then, each hinge core 34 moves in the arrow A directions in FIG. 8 respectively together with the pair of main cores 30, and the inner die 24 can be effortlessly pulled out of the tube main body 12.

Namely, in the die 20 for forming a curved tube of the present embodiment, the concave portion 16 is formed in the inner periphery 14A inside the bending direction of the bent portion 14 of the tube main body 12 along the direction of the axis line 12A by the hinge core 34 inserted into the groove portion 32 of the pair of main cores 30 of the inner die 24. Consequently, a structure of the inner die 24 of the die 20 for forming a curved tube becomes simplified so as to be applied to the curved tube having the small diameter as well. Also, in the molded tube main body 12, the concave portion 16 formed along an axis line direction in the inner periphery 14A inside the bending direction of the bent portion 14 can reduce the pressure loss of the fluid.

(Other Embodiments)

In the above, the present invention has been explained in detail with specific embodiments; however, the present invention is not limited to the aforementioned first embodiment, and it is obvious for a person skilled in the art to be able to provide other various embodiments within a range of the present invention. For example, as a second embodiment shown in FIGS. 9 to 12, the shape of both side wall portions 16B and the bottom face 16A in the concave portion 16 viewed from the axis line 12A direction may form an arc protruding to the outer peripheral side of the tube main body 12, wherein borders J between both side wall portions 16B and the bottom face 16A are bent. Thereby, a flow-path cross-section area of the bent portion 14 of the tube main body 12 can enlarge. As a result, the pressure loss of the fluid can be reduced. Incidentally, there may be provided two or more bent borders J.

Figure 13:
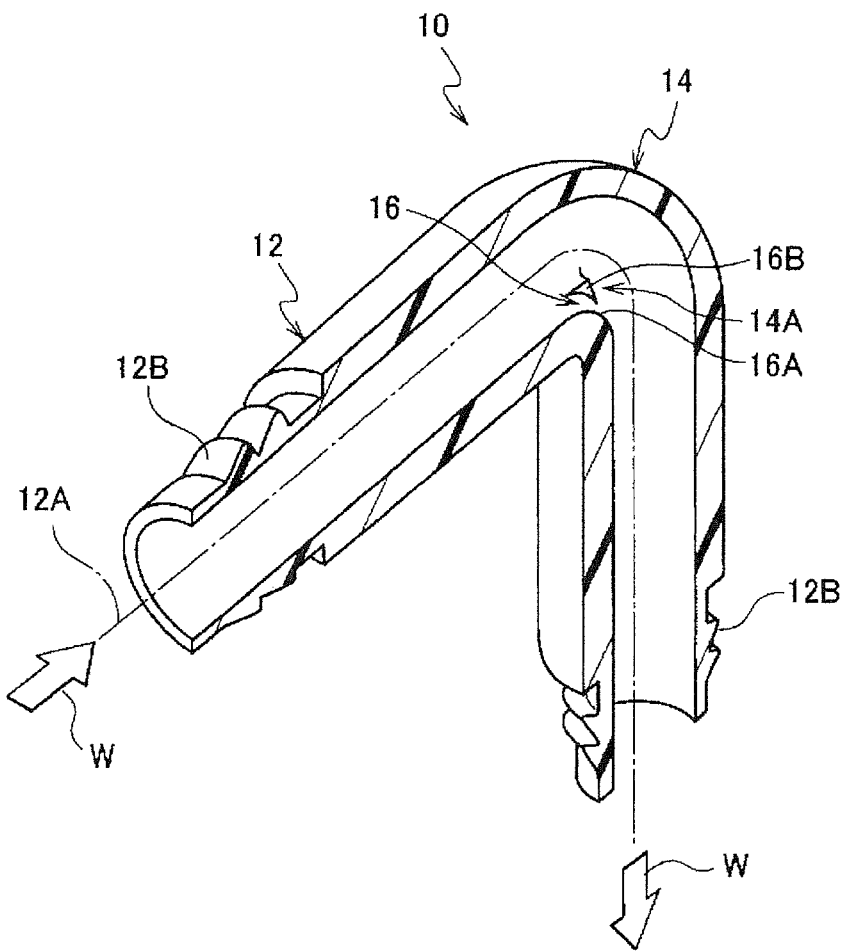
FIG. 13 is a perspective view corresponding to FIG. 1 showing the curved tube structure according to a third embodiment of the present invention.
Figure 14:
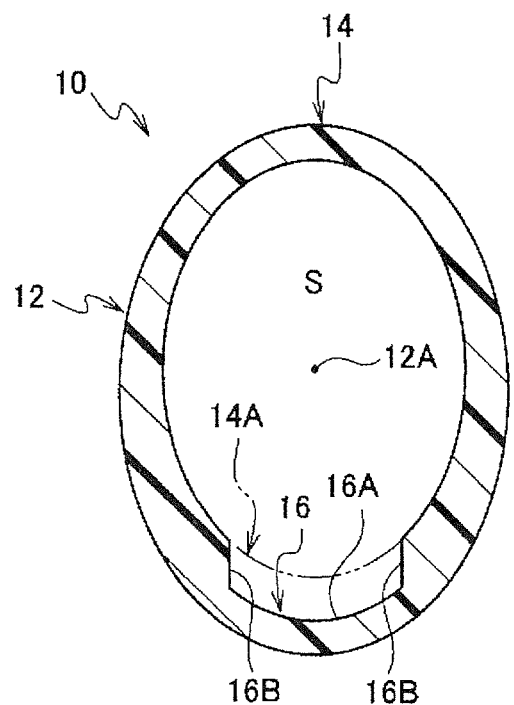
FIG. 14 is a cross-sectional view corresponding to FIG. 3 showing the curved tube structure according to the third embodiment of the present invention.
Figure 15:
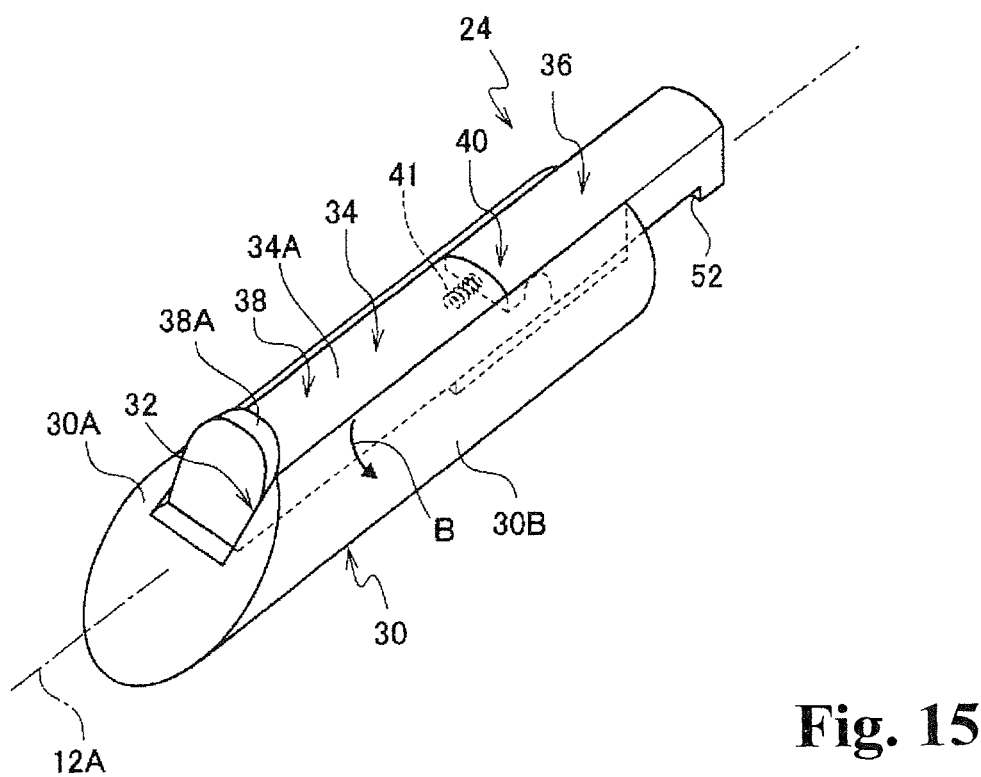
FIG. 15 is a perspective view showing the inner die of the die for forming a curved tube viewed from the tip side according to the third embodiment of the present invention.

Also, as a third embodiment shown in FIGS. 13 to 15, the shape of the concave portion 16 viewed from the axis line 12A direction may form an arc wherein both side wall portions 16B have straight lines along a swing direction of the hinge core 34 and the bottom face 16A protrudes to the outer peripheral side of the tube main body 12. Thereby, the flow-path cross-section area of the bent portion 14 of the tube main body 12 can enlarge. As a result, the pressure loss of the fluid can be reduced. Also, the bottom face 16A of the concave portion 16 forms a curved face protruding to an axis line 12A side when the concave portion 16 is viewed from the side orthogonal in the direction of the axis line 12A, and the flow path of the bent portion 14 becomes smooth. Consequently, the flow path of the bent portion 14 becomes smooth, and the pressure loss of the fluid can be reduced further.

Figure 16:
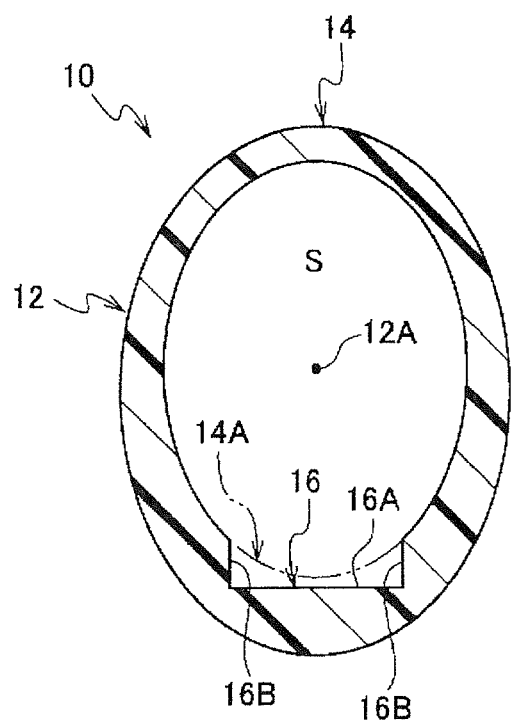
FIG. 16 is a cross-sectional view corresponding to FIG. 3 showing the curved tube structure according to a fourth embodiment of the present invention.

Also, as a fourth embodiment shown in FIG. 16, the shape of the concave portion 16 viewed from the axis line 12A direction may be formed so that both side wall portions 16B have straight lines along the swing direction of the hinge core 34 and the bottom face 16A has a straight line vertical to both side wall portions 16B. Thereby, a structure of the hinge core 34 of the inner die 24 can be simplified. Incidentally, the shape of the concave portion 16 viewed from the axis line 12A direction is not limited to the shape of each of the aforementioned embodiments, and may have another shape.

Figure 17:
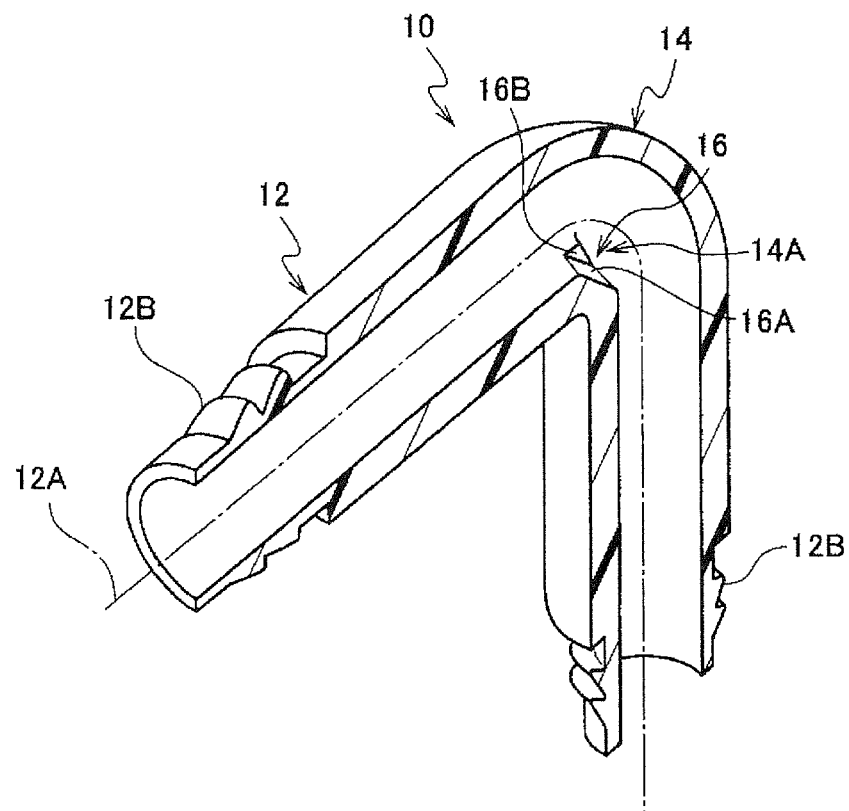
FIG. 17 is a perspective view corresponding to FIG. 1 showing the curved tube structure according to a fifth embodiment of the present invention.

Also, as a fifth embodiment shown in FIG. 17, the bottom face 16A of the concave portion 16 may have an inclined face when the concave portion 16 is viewed from the side orthogonal in the direction of the axis line 12A. Thereby, the structure of the hinge core 34 of the inner die 24 can be simplified. Incidentally, the shape of the concave portion 16 viewed from the side orthogonal in the direction of the axis line 12A is not limited to the shape of each of the aforementioned embodiments, and may have another shape.

Also, each of the aforementioned embodiments has a structure in which the swing portion 38 swings to the formation position (the swing position of the swing portion 38) of the main core 30 where the main core 30 has moved to provide the empty space by the urging device such as the coil spring 41 and the like embedded in the hinge portion 40 of the hinge core 34 as the sub core. Instead of this, the embodiment may have a structure in which the swing portion 38 swings to the formation position (the swing position of the swing portion 38) of the main core 30 where the main core 30 has moved to provide the empty space by elastically deforming the hinge portion itself.

Figure 18:
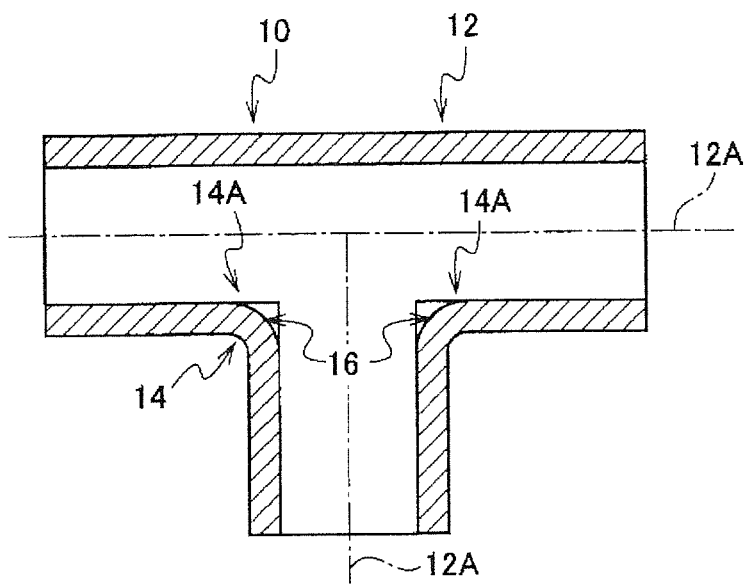
FIG. 18 is a cross-sectional view taken along the axis line direction of the curved tube showing the curved tube structure according to a sixth embodiment of the present invention.
Figure 19:
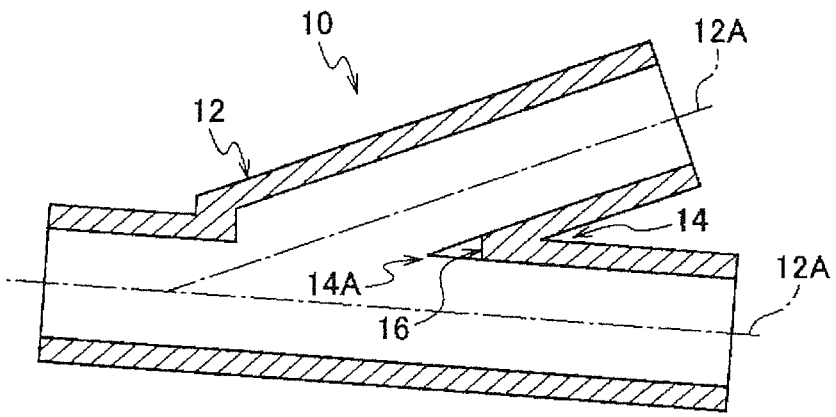
FIG. 19 is a cross-sectional view taken along the axis line direction of the curved tube showing the curved tube structure according to a seventh embodiment of the present invention.
Figure 20:
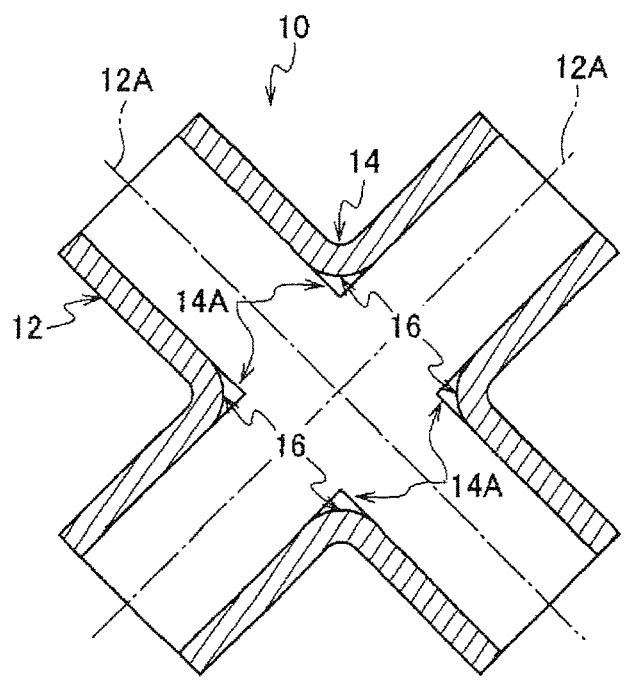
FIG. 20 is a cross-sectional view taken along the axis line direction of the curved tube showing the curved tube structure according to an eighth embodiment of the present invention.

Also, in each embodiment, the curved tube structure and the die for forming a curved tube of the present invention are applied to the curved tube having the shape including the bent portion 14 bent approximately at the right angle at one portion in the direction of the axis line 12A; however, the curved tube structure and the die for forming a curved tube of the present invention can be applied to a curved tube having another bent shape as well. For example, as a sixth embodiment shown in FIG. 18, the curved tube structure and the die for forming a curved tube of the present invention can be applied to a curved tube including a T-shaped bent portion 14 at one portion in the axis line direction of the tube main body 12 as well. Also, as a seventh embodiment shown in FIG. 19, the curved tube structure and the die for forming a curved tube of the present invention can be applied to a curved tube including a Y-shaped bent portion 14 at one portion in the axis line direction of the tube main body 12 as well. Also, as an eighth embodiment shown in FIG. 20, the curved tube structure and the die for forming a curved tube of the present invention can be applied to a curved tube including an X-shaped bent portion 14 at one portion in the axis line direction of the tube main body 12 as well.

Figure 21:
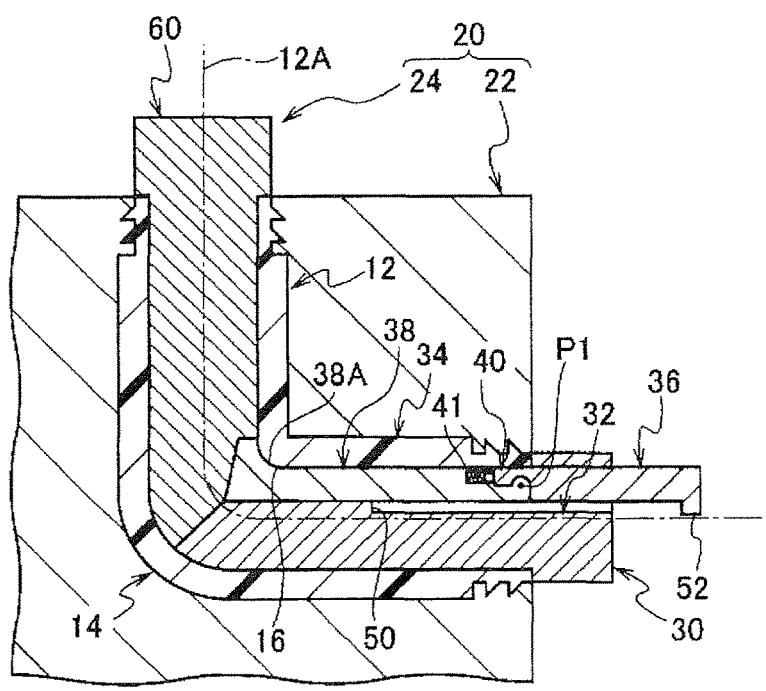
FIG. 21 is a cross-sectional view taken along the axis line direction of the curved tube showing the formation position of the die for forming a curved tube according to a ninth embodiment of the present invention.
Figure 22:
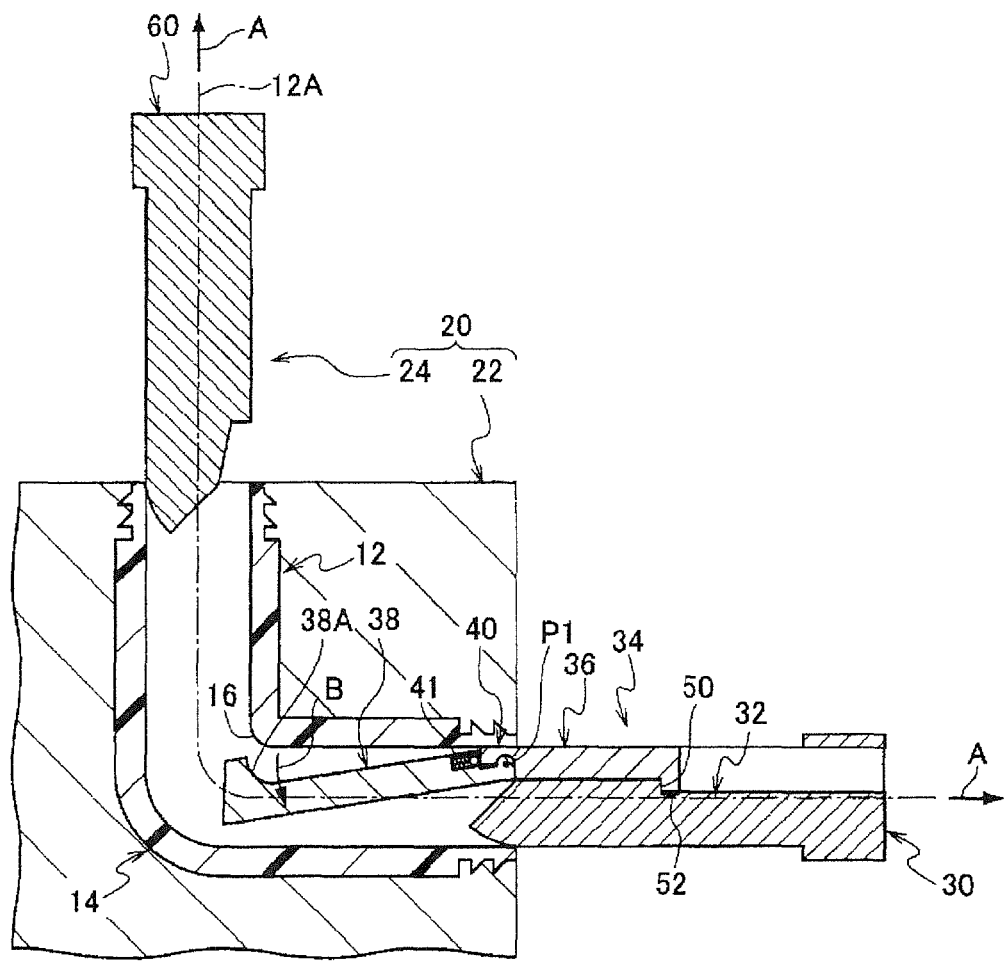
FIG. 22 is a cross-sectional view taken along the axis line direction of the curved tube showing a middle of the mold release of the die for forming a curved tube according to the ninth embodiment of the present invention.

Also, in each of the aforementioned embodiments, the inner die 24 is formed to include the pair of main cores 30 having the same shape and including the hinge cores 34 as the sub cores. Instead of this, as a ninth embodiment shown in FIGS. 21 and 22, the inner die 24 may be formed to include the main core 30 including the hinge core 34 as the sub core; and a main core 60 without the sub core. Incidentally, in the present embodiment, the tip 38A of the swing portion 38 of one hinge core 34 corresponds to the undercut portion of the whole area of the concave portion 16 formed in the inner periphery 14A inside the bending direction of the bent portion 14 of the tube main body 12, and the tip 38A of the swing portion 38 forms the curved shape engaging with the whole area of the concave portion 16.

What is claimed is:

1. A curved tube structure, comprising:
   a tube main body made of resin and including a bent portion at one portion in an axis line direction to be bent in a bending direction; and
   an enlarged cross-section portion formed along the axis line direction of the tube main body on an inner periphery of the bent portion at only an inner side of the bent portion relative to the bending direction for enlarging a cross-section area of the tube main body,
   wherein the enlarged cross-section portion has a concave portion protruding toward an outer peripheral side of the tube main body when the enlarged cross-section portion is viewed from the axis line direction,
   the concave portion includes a bottom face and two side wall portions smoothly connected to the bottom face at two sides of the bottom face to form an arc when the enlarged cross-section portion is viewed from the axis line direction, and the two side wall portions are arranged apart from each other to form a distance therebetween, and
   when the bent portion is viewed from the axis line direction, the distance between the two side wall portions is shorter than an inner diameter of the tube main body parallel to a measured distance between the two side wall portions and orthogonal to an axis line of the tube main body.

2. A curved tube structure according to claim 1, wherein the concave portion has a shape in which the two side wall portions and the bottom face protrude to the outer peripheral side of the tube main body to form the arc when the enlarged cross-section portion is viewed from the axis line direction.

3. A curved tube structure according to claim 2, wherein a border between each of the two side wall portions and the bottom face is bent to form the arc.

4. A curved tube structure according to claim 1, wherein the concave portion has a shape in which the two side wall portions have straight lines and the bottom face protrudes to the outer peripheral side of the tube main body to form the arc when the enlarged cross-section portion is viewed from the axis line direction.

5. A curved tube structure according to claim 1, wherein the concave portion has a shape in which the two side wall portions and the bottom face have straight lines.

6. A curved tube structure according to claim 1, wherein the bottom face of the concave portion forms a curved face protruding outwardly in the axis line direction when the concave portion is viewed from a side orthogonal to the axis line direction.

7. A curved tube structure according to claim 1, wherein the bottom face of the concave portion forms an inclined face when the concave portion is viewed from a side orthogonal to the axis line direction.

8. A curved tube structure according to claim 1, wherein the concave portion is formed only at the inner side of the bent portion relative to the bending direction, and the bottom face and the two side wall portions are integrally connected to form the arc having a curvature larger than that of an inner periphery of the tube main body.

9. A curved tube structure according to claim 1, wherein the tube main body has a flow path having a circular cross section, the bent portion has a further flow path communicating with the flow path and having an oblong cross section, and the concave portion is formed at a lower portion of the bent portion forming the oblong cross section.

10. A curved tube structure according to claim 1, wherein when the bent portion is viewed from the axis line direction, a distance between the axis line and the bottom face is longer than a distance between the axis line and the inner periphery at an outer side of the bent portion opposite to the bottom face, in a direction orthogonal to the axis line, so that the concave portion protrudes toward the outer peripheral side at the inner side of the bent portion further than the inner peripheral of the bent portion at the outer side of the bent portion.

11. A curved tube structure, comprising:

a tube main body made of resin and including a bent portion at one portion in an axis line direction to be bent in a bending direction; and an enlarged cross-section portion formed along the axis line direction of the tube main body on an inner periphery of the bent portion at only an inner side of the bent portion relative to the bending direction for enlarging a cross-section area of the tube main body, wherein the enlarged cross-section portion has a concave portion protruding toward an outer peripheral side of the tube main body when the enlarged cross-section portion is viewed from the axis line direction, the concave portion includes a bottom face and two side wall portions connected to the bottom face at two sides of the bottom face when the enlarged cross-section portion is viewed from the axis line direction, and the two side wall portions are arranged apart from each other to form a distance therebetween, when the bent portion is viewed from the axis line direction, the distance between the two side wall portions is shorter than an inner diameter of the tube main body parallel to a measured distance between the two side wall portions and orthogonal to an axis line of the tube main body, and the two side wall portions extend linearly toward the bottom face in a direction apart from the axis line, and the bottom face linearly extends between lower ends of the two side wall portions in a direction orthogonal to the axis line.

* * * * *